US012333173B2

(12) United States Patent
Halstuch et al.

(10) Patent No.: US 12,333,173 B2
(45) Date of Patent: Jun. 17, 2025

(54) TRANSPARENT DATA MOVEMENT BETWEEN A PRIVATE CLOUD AND STORAGE ECOSYSTEM AND ANOTHER STORAGE SYSTEM (71) Applicant: RackTop Systems, Inc., Fulton, MD (US)

(72) Inventors: Jonathan Halstuch, Fulton, MD (US); Eric Bednash, Fulton, MD (US); Anil Vijarnia, Columbia, MD (US)

(73) Assignee: RackTop Systems, Inc., Fulton, MD (US)

( * ) Notice: Subject to any disclaimer, the term of this patent is extended or adjusted under 35 U.S.C. 154(b) by 0 days.

(21) Appl. No.: 15/880,235

(22) Filed: Jan. 25, 2018

(65) Prior Publication Data
US 2019/0205056 A1 Jul. 4, 2019

Related U.S. Application Data (60) Provisional application No. 62/611,074, filed on Dec. 28, 2017.

(51) Int. Cl.
G06F 3/06 (2006.01)
G06F 16/11 (2019.01)
H04L 67/1097 (2022.01)

(52) U.S. Cl.
CPC ........... *G06F 3/0646* (2013.01); *G06F 3/067* (2013.01); *G06F 16/122* (2019.01); *H04L 67/1097* (2013.01)

(58) Field of Classification Search
CPC ................ G06F 3/0646; G06F 16/122
See application file for complete search history.

(56) References Cited

U.S. PATENT DOCUMENTS

| | | | | |
|---|---|---|---|---|
| 7,293,133 B1* | 11/2007 | Colgrove | .............. | G06F 3/0608 711/111 |
| 8,127,095 B1* | 2/2012 | Colgrove | ............ | G06F 11/1451 711/202 |
| 2002/0161855 A1* | 10/2002 | Manczak | ................ | H04L 29/06 709/219 |
| 2007/0136308 A1* | 6/2007 | Tsirigotis | ............ | H04L 67/1097 |
| 2007/0179995 A1* | 8/2007 | Prahlad | ............. | G06F 16/24575 |

(Continued)

*Primary Examiner* — Jared I Rutz
*Assistant Examiner* — Alexander J Yoon
(74) *Attorney, Agent, or Firm* — Carr & Ferrell LLP (57) ABSTRACT The disclosure provides methods and systems for transparent data movement between a private cloud storage ecosystem and another storage system. The other storage system may be local storage or external storage separate and apart from the private cloud storage ecosystem. Originally, metadata and the data contents of a file are both stored on local storage in the private cloud storage ecosystem. The method separates the metadata from the data contents of a file such that the metadata and data contents are independently operable. After separation and based on policy, the data content is transparently moved between the private cloud storage system and the other storage system. The data is managed and tracked such that a user, e.g., a client or external program/entity, may access the data content using the original metadata stored on the private cloud storage ecosystem, despite the movement of the data contents to the other storage system.

24 Claims, 9 Drawing Sheets (56) References Cited

U.S. PATENT DOCUMENTS

| | | | | |
|---|---|---|---|---|
| 2013/0111262 A1* | 5/2013 | Taylor | ............... | G06F 11/2005 |
| | | | | 714/4.11 |
| 2013/0138908 A1* | 5/2013 | Iwasaki | ............... | G06F 3/0607 |
| | | | | 711/165 |
| 2013/0282662 A1* | 10/2013 | Kumarasamy | ......... | G06F 11/14 |
| | | | | 707/649 |
| 2014/0006465 A1* | 1/2014 | Davis | ............... | G06F 16/1752 |
| | | | | 707/827 |
| 2014/0304309 A1* | 10/2014 | Diederich | .......... | H04L 67/1097 |
| | | | | 707/812 |
| 2015/0280959 A1* | 10/2015 | Vincent | ............... | H04L 67/52 |
| | | | | 709/203 |
| 2015/0293699 A1* | 10/2015 | Bromley | ............. | G06F 3/0649 |
| | | | | 711/161 |
| 2016/0179840 A1* | 6/2016 | Dani | ............... | G06F 16/24561 |
| | | | | 707/824 |
| 2017/0075907 A1* | 3/2017 | Goswami | ........... | G06F 11/0709 |
| 2018/0373745 A1* | 12/2018 | Bhagwat | ............ | G06F 16/2272 |

\* cited by examiner

TRANSPARENT DATA MOVEMENT BETWEEN A PRIVATE CLOUD AND STORAGE ECOSYSTEM AND ANOTHER STORAGE SYSTEM

CROSS REFERENCE TO RELATED APPLICATIONS

The present application claims the benefit of U.S. Provisional Application No. 62/611,074, filed on Dec. 28, 2017, which is incorporated herein by reference for all purposes.

FIELD

This disclosure generally relates to storage for files and, more particularly, to the movement of files to other storage.

BACKGROUND

Storing an enterprise's data on high speed storage devices, such as solid state drive arrays, is typically more costly per byte than storing on slower storage devices, such as hard disk drives. Also, some data may not be accessed often enough to justify utilizing the limited resources available on high speed storage devices. Local storage availability is also typically limited so there is generally a need to also store at least some data off premises on external storage.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to transparent data movement between a private cloud storage ecosystem and another storage system. In some embodiments, the other storage system can include multiple systems. In various embodiments, the present technology includes separating metadata from data (contents) for a file stored in a private cloud and storage ecosystem, such that the metadata and data contents can operate independently. The private cloud and storage ecosystem is also referred to herein as a private cloud storage system. The data contents and metadata are also referred to herein as the data and metadata respectively. Once there is separation of the metadata and data, the data movement is performed transparently according to various embodiments. In various embodiments, the data movement to other storage is transparent in the sense that a client or external program/entity can access the data contents in the same manner as before it was transparently moved (e.g., using the same workflow or client mount points and the original metadata).

According to one aspect of the present disclosure, provided is a computer-implemented method for providing transparent movement of data between a private cloud storage ecosystem and another storage system. In various embodiments, the method includes separating the metadata from the data contents of one or more files stored in a private cloud storage ecosystem. The separating may include storing the metadata and data contents for each of the one or more files separately such that the metadata and data contents are independently operable. The method may also include based on a policy, selectively moving the data contents of the one or more files transparently between the private cloud storage ecosystem and another storage system. The other storage system may include multiple systems separate from the private cloud storage ecosystem. According to some embodiments, data may be stored in more than one place at the same time and using different storage technologies. In an example embodiment, two files can appear to the user as if both are stored in the same folder, but the data contents for the two files could be stored on two different storage systems.

According to other aspects of various embodiments, the metadata for each of the one or more files remains stored on the private cloud storage ecosystem in its original location and the corresponding file data contents is moved to the other storage system. The other storage system may be local storage in the private cloud storage ecosystem. The other storage may be external storage that is separate and apart from the private cloud storage ecosystem, e.g., public cloud storage system, a different private cloud storage system, or disk storage on an external server. In various embodiments, the private cloud storage ecosystem is variously coupled via one or more communication networks (e.g., the Internet) to the client or external program/entity and to the other storage.

According to other aspects of various embodiments, the method also includes managing and tracking movement of the selectively moved data contents of each file of the one or more files. The managing and tracking may include storing in a database an identification of each of the one or more files for which the respective data contents has been or is being selectively moved. The identification may include the destination and other identifying information for the selectively moved files. The tracking may include tracking the movement of the file data contents, including its destination, with the metadata stored on the private cloud storage ecosystem.

According to other aspects of various embodiments, the method comprises, in response to a request to the private cloud storage ecosystem from the client or the external program/entity, providing access to the moved data contents of the one or more files. The request may be a read/write request regarding the contents of a file. Providing access to the moved data contents of the one or more files may include, based on the respective metadata stored on the private cloud storage system, obtaining a destination of the corresponding moved file contents from the database. Based on the destination, read or write access may be provided for the respective data contents of the one or more files on the other storage system.

According to other aspects, the access to the moved data contents is provided to the client or an external program/entity via a network file sharing protocol, such that the client or an external program/entity accesses the requested file contents by accessing the respective metadata stored on the private cloud storage ecosystem using the network file sharing protocol. The protocols may include, for example, Service Message Block (SMB), Network File System (NFS), or Apple File Protocol (AFP) such as utilized for a NAS system. Other suitable protocols may be used for practicing various embodiments of the methods described herein. According to certain aspects of various embodiments, the file's data contents are accessible to the client or the external program/entity using the respective metadata by communicating with the private cloud storage ecosystem via a network file sharing protocol, such that workflow or client mount points are unchanged as a result of the movement of the data contents of the one or more files.

According to another aspect of the present disclosure, the transparent movement of data may be based on a policy specifying Hierarchal Storage Management (HSM) or a specific user-defined policy or combination of user-defined policies.

In further embodiments, the method steps are stored on a machine-readable medium, comprising instructions, which when implemented by one or more processors perform the steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computing device (e.g., a desktop computer, a tablet computer, a laptop computer, or other computing device).

Systems and methods are provided in various embodiments for transparent data movement between a private cloud and storage ecosystem and another storage system. Various embodiments include separating metadata from data (contents) stored in a private cloud and storage ecosystem, such that the metadata and the data can operate independently (i.e., are independently operable). Once there is the separation of metadata and data, various embodiments provide for transparent data movement between the private cloud and storage ecosystem and other storage systems. As used herein for various embodiments, the private cloud and storage ecosystem is private in the sense of not being openly available on the public Internet. The other storage system may be other local storage or external storage. For local storage, data contents may be moved, for example, from faster to slower, less costly disks in the same private cloud storage system. Data contents may be moved to less costly external storage. The external storage may be a public cloud storage system, another private cloud storage system, disk storage on an external server, or other external storage system.

Figure 1:
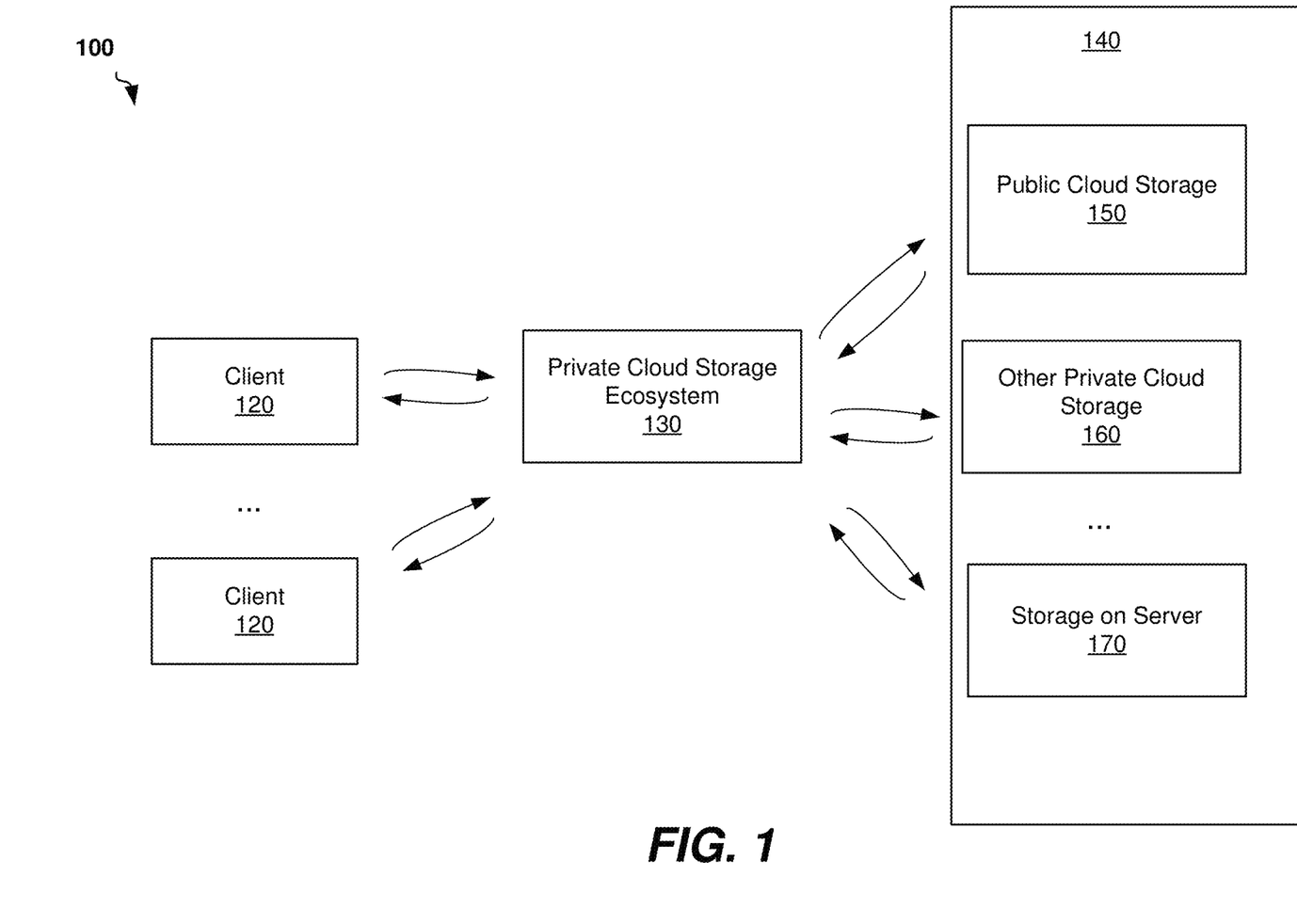
FIG. 1 shows an example high level system architecture embodiment for implementing certain aspects of the methods and systems for transparent data movement according to various embodiments.

FIG. 1 shows an example high level system architecture 100 for implementing certain aspects of the methods and systems for transparent data movement. System architecture 100 includes one or more clients 120, a private cloud storage ecosystem 130 (also referred to as private cloud and storage ecosystem herein) and other storage 140. The clients 120 may be a client or external program/entity that create read or write requests in order to access a file using metadata stored on the private cloud storage ecosystem 130, as will be explained further herein. The other storage 140 may variously be public cloud storage 150, other private cloud storage 160, or storage on server 170. In some embodiments, the other private cloud storage 160 can be other local storage in the private cloud storage ecosystem 130. In various embodiments, the clients 120, the private cloud storage ecosystem, and the other storage are variously coupled via one or more communication networks (e.g., the Internet) as represented by the line pairs in the example in FIG. 1.

According to various embodiments, in the architecture in FIG. 1, in operation, metadata is separated from the data contents for files in the private cloud storage ecosystem 130, such that the metadata and data contents can be operated on independently, i.e., are independently operable. Once there is the separation of the metadata and the data contents, according to various embodiments, the data contents may be transparently moved from the private cloud storage ecosystem 130 and the other storage 140.

Figure 2:
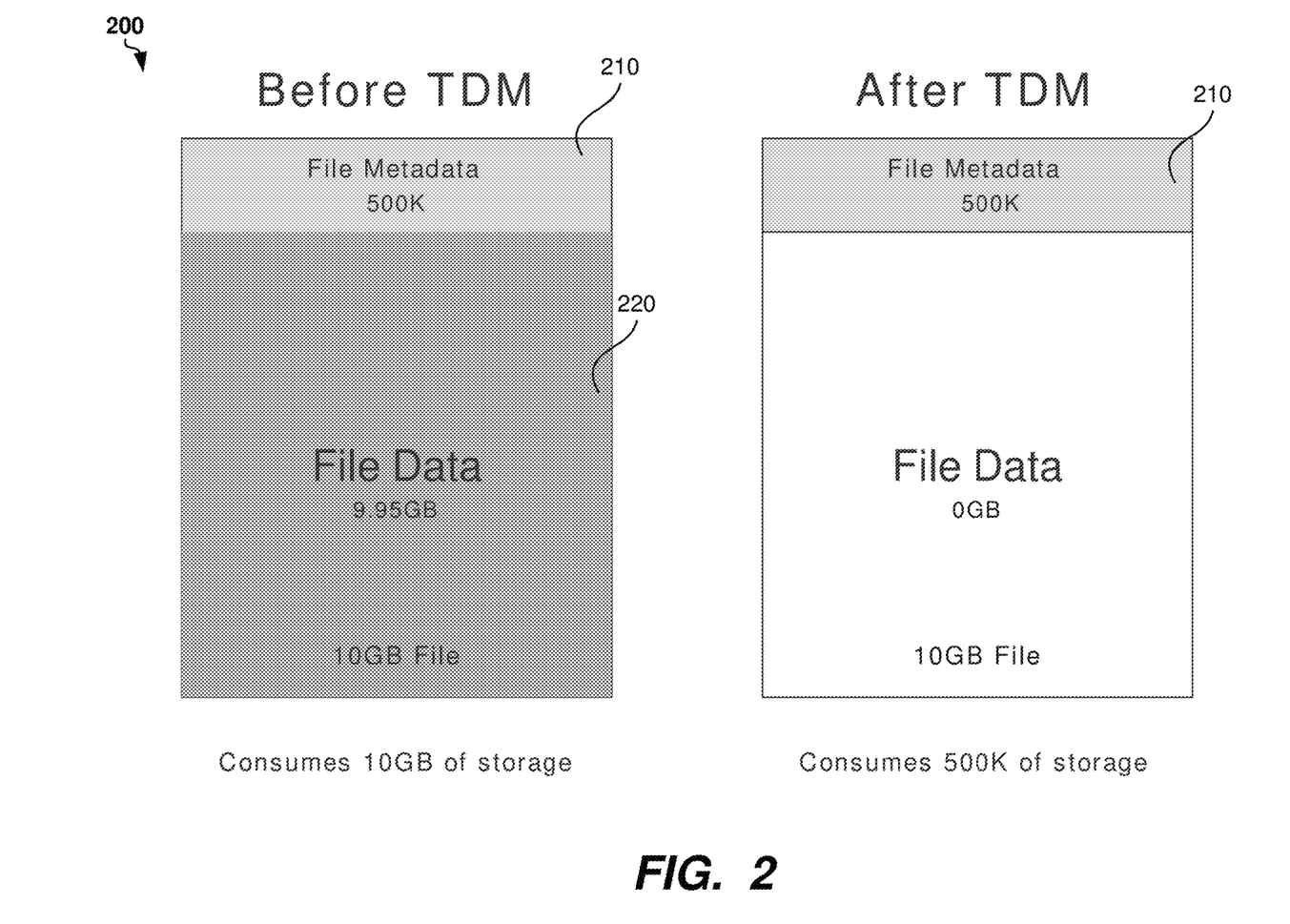
FIG. 2 illustrates an example of a desired result of the transparent data movement (TDM) showing how much storage is consumed before and after the transparent data movement, according to an example embodiment.

FIG. 2 illustrates a diagram 200 illustrating a desired result of the transparent data movement (TDM) according to an example embodiment. More specifically, the diagram 200 illustrates graphically how much storage is consumed before and after the transparent data movement from the private cloud storage ecosystem to other storage for an example embodiment. In the example in FIG. 2, before TDM, the file comprises file metadata 210 and file data (content) 220. The file metadata 210 is information associated with the file data 220, e.g., information which may include, for example, content type, content size, when and how the content was created, and other identifying information. The file data can consume 99% of the storage space. Typically, the file metadata 210 and the file data 220 are stored together in a file system as shown in "Before TDM" in the example in FIG. 2. According to various embodiments, the methods and systems for transparent data movement include separating the file metadata 210 and file data (contents) 220 and storing the file metadata 210 and file data 220 independently. FIG. 2 provides an example showing the storage before TDM and after TDM for a particular file. In this example, "Before TDM", the file data (contents) 220 consumes 9.95 GB of storage and the file metadata 210 consumes 500 K of storage, for a total of 10 GB of storage for the file. "After TDM" in this example, the file data (contents) 220 has been transparently moved to other storage and the file metadata 210 remains in place, such that only 500 K of storage in consumed after TDM. The TDM technology in this example embodiment provided a 20× reduction in capacity for the file storage system.

One of the other advantages of the TDM technology according to various embodiments, is that a client or external program/entity using the storage system never needs to change workflow or client mount points to account for the movement of the data contents since the data contents are accessible using the original metadata, i.e., the movement of the data has been made transparent to the user.

In various embodiments, a TDM server executing the method of the present technology can transparently move data to "back-end" servers or cloud ("targets") without affecting the client or external program/entity, i.e., the movement is transparent to them. Various exemplary embodiments support other storage including "back-end" servers or the cloud ("targets") that support Network File System (NFS) and Amazon Simple Storage Service (S3), to name a few. Example targets are shown in FIG. 3.

Figure 3:
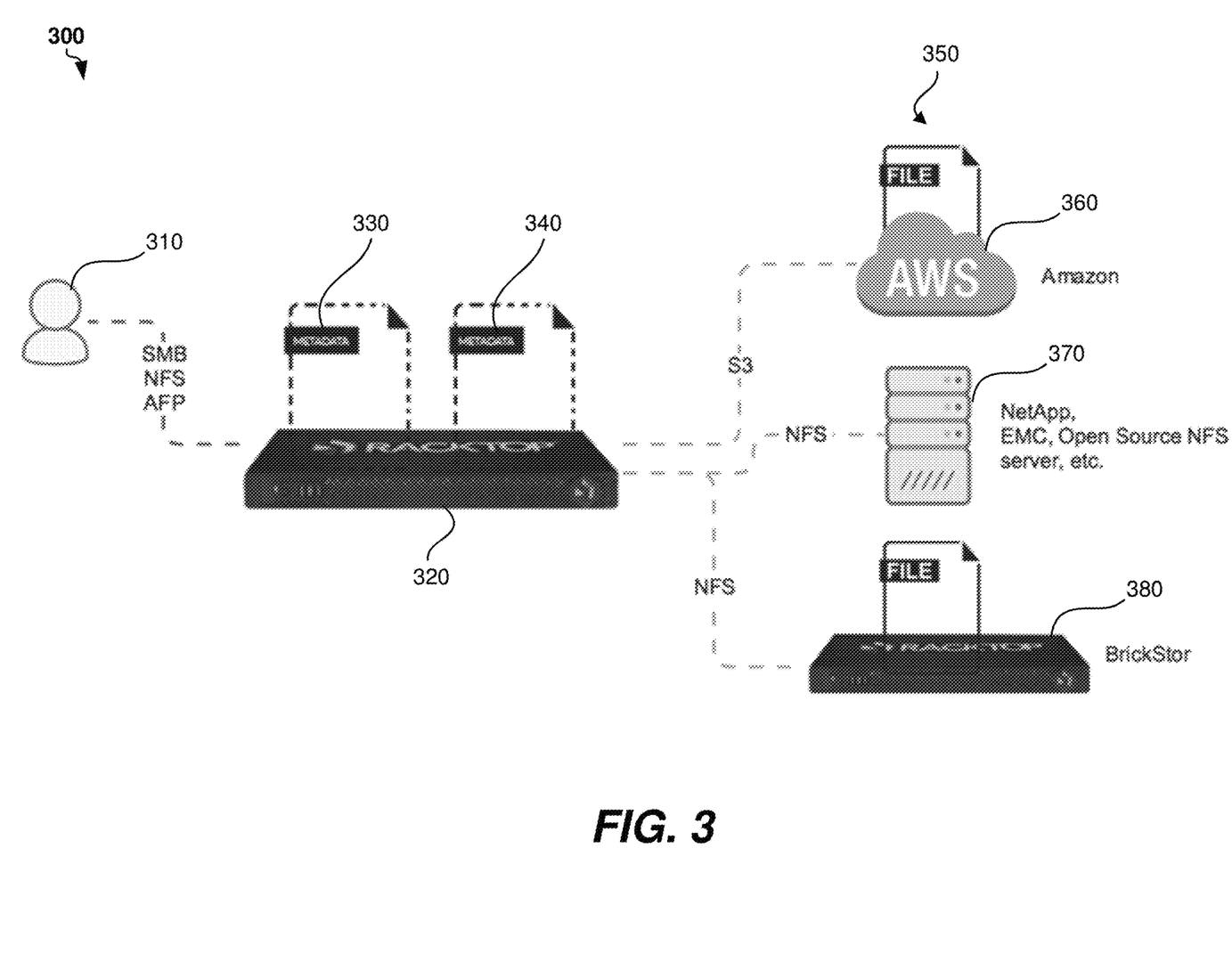
FIG. 3 illustrates an example embodiment of the architecture in FIG. 1 illustrating aspects with respect to the transparent data movement.

FIG. 3 illustrates an example embodiment 300 of the architecture in FIG. 1 illustrating aspects with respect to the transparent data movement. FIG. 3 shows a user 310 (client or an external program/entity) communicatively coupled to a private cloud storage ecosystem 320 (shown as a RackTop device storing metadata 330, 340 for various files in this example). The private cloud storage ecosystem 320 is communicatively coupled to other storage 350, also referred to as a target or target system. The other storage is storage other than the private cloud storage ecosystem 320 and may include various target systems including a "back-end" server, public cloud storage, other private cloud storage, or other storage. The other storage 350 shown in this example in FIG. 3 include an S3 target Amazon Web Services (AWS) identified as 360, an NFS target NetApp, EMC, Open Source NFS server, etc. identified as 370, and an NFS accessible BrickStor device identified as 380.

For the example in FIG. 3, file data (contents) can be variously transparently moved from the private cloud storage ecosystem 320 to the various other storage, target systems. In the example in FIG. 3, only metadata 330 and 340 is stored on the private cloud storage ecosystem 320 with the respective data contents having been moved to the other storage 350, e.g., to target systems 360, 370, and/or 380 of the other storage 350.

As shown in the example in FIG. 3, in operation, a user (client or external program/entity) 310 can use standard network protocols (e.g., Service Message Block (SMB), NFS, Apple File Protocol (AFP)), to communicate with the private cloud storage ecosystem 320 to access the data content that was moved to the other storage 350. The user (client or external program/entity) 310 can thus use the original metadata (e.g., metadata 330 and metadata 340) stored on the private cloud storage ecosystem 320, without having to change workflow or client mount points as a result of the movement of the data contents of the one or more files.

According to various embodiments, the transparent data movement is based on policy. TDM can also eliminate data migrations, "fork-lift" upgrades, and enable 3rd party systems to take advantage of available cyber and compliance features.

In various embodiments, data can be selected for transparent data movement based on a policy specifying Hierarchal Storage Management (HSM) or may be based on a different user-defined policy or combination of policies. These policies can take into account several characteristics of the file in choosing whether the file should be selected for transparent data movement to other storage (e.g., another storage tier) or excluded. If selected for TDM, the content data would be moved to another tier of storage based on what tier is selected, e.g., by the policy. For example, according to one user-defined policy, a user can define a folder and all its contents to be selected for TDM and a target tier. In another example, a user can define a policy that selects files that have not been accessed in a threshold period of time (stale files), e.g., nobody has read/opened this file in a certain time period. A policy may be one in which the user can set a size of file within a directory structure that should be moved or a combination of size and last time accessed. According to another example policy, a user can choose file types that should be specifically selected for TDM or excluded from TDM. The user can use a metadata tag on files that would override and have precedence for what files are selected for TDM. Tags may be based on geographical restrictions, for example, not permitting transparent data movement out of the geography due to certain regulations. For instance, the data may be covered under the General Data Protection Regulation (GDPR) that addresses export of personal data outside the European Union.

Figure 4:
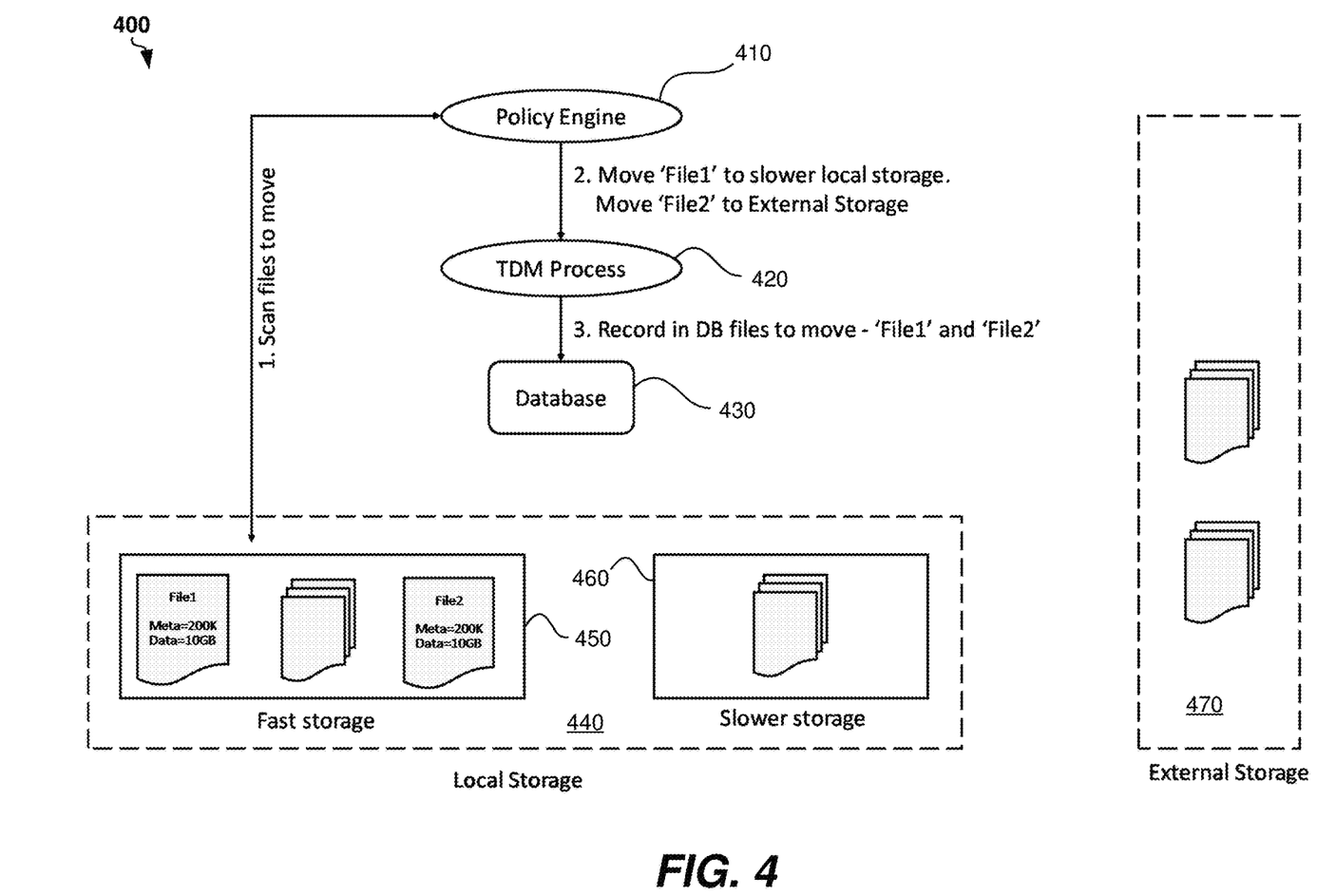
FIGS. 4 and 5 illustrate aspects of a process of separating data and metadata, according to an example embodiment.
Figure 5:
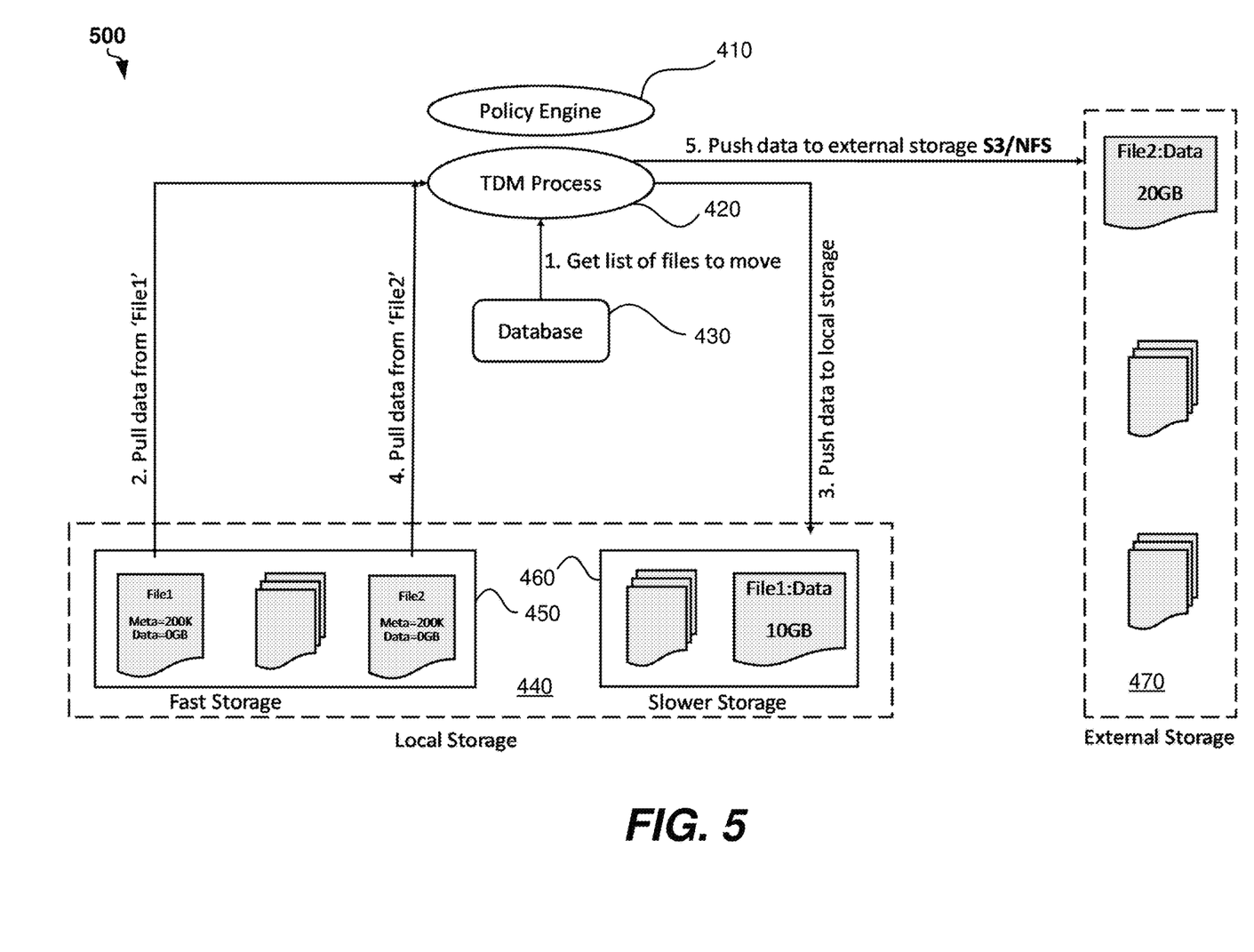
Figure 6:
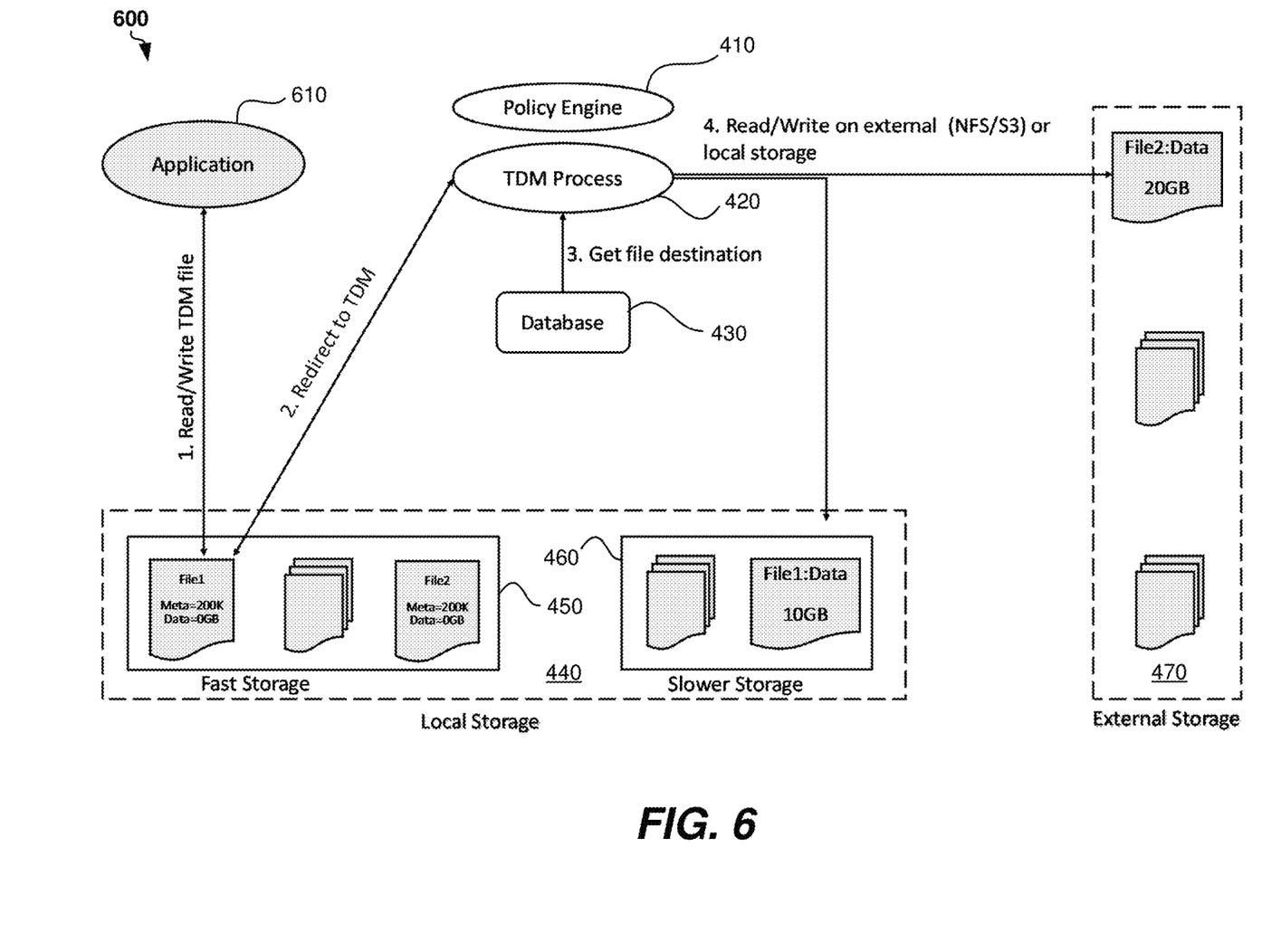
FIG. 6 illustrates input and output (IO) flow after the data, metadata separation in FIGS. 4 and 5, according to an example embodiment.

FIGS. 4 and 5 show an example process of separating data and metadata, and FIG. 6 shows IO after this (data, metadata) separation, according to an example embodiment.

The example process 400 in FIG. 4 shows the following elements: a policy engine 410, a TDM process 420 (e.g., running on a TDM server), a database 430, local storage 440 (including fast storage 450 and slower storage 460), and external storage 470. In various embodiments, the policy engine 410 may run as part of the private cloud storage ecosystem such that the transparent movement of data is based on a policy specifying Hierarchal Storage Management (HSM) or a specific user-defined policy or combination of user-defined policies. In various embodiments, as part of the management and tracking of files, the TDM process 420 may run on a TDM server as part the private cloud storage ecosystem for processing the movement of data based on the specified policy. Also as part of the management and tracking of files, the database 430 may reside on the private cloud storage ecosystem and can store an identification of each of the files for which the respective data content is to be selectively moved. The database 430 can variously provide, to the TDM process 420, a list of files to be moved, and for moved files, provide the current destination for the moved file. In some embodiments, the policy engine 410, TDM process 420, and database 430 may run on a server or servers separate from the private cloud storage ecosystem.

In the example FIG. 4, the steps shown begin with step 1, scan files to move. Based on the policy engine 410 in this example, the next step 2 is a policy "directive" to move "File1" from fast local storage 450 to slower local storage 460, and to move "File2" to external storage 470. The TDM process in this example at step 3, records in a database 430 the files to move, i.e., "File1" and "File2". In this example, "File1" has 200K of metadata and 10 GB of data (contents) and "File2" has 200K of metadata and 10 GB of data (contents).

FIG. 5 is an example 500 illustrating further steps in the method according to various embodiments. Step 1 in the example in FIG. 5 shows the TDM process 420 gets a list of files to move from the database 430. In this example, the list includes "File1" and "File2". Step 2 includes pulling data from "File1" in fast storage 450 of the local storage 440. Step 3 includes pushing the 10 GB of "File1" data (contents), i.e., "File1:Data", to the slower storage 460 of the local storage 440.

Step 4 in the example in FIG. 5 includes pulling data from "File2" in fast storage 450. Step 5 includes pushing the "File2" data to external storage 470, using the S3 or NFS protocol in this example.

The resultant storage of the data (contents) after the transparent data movement steps in FIG. 5 is having the 10 GB of "File1:Data" contents moved to slower local storage and the 20 GB of "File2:Data" contents moved to external storage 470. The associated 200K of metadata "Meta" for "File1" and "File2" remains unchanged in its original location in fast storage 450 in this example.

FIG. 6 is an example illustrating further steps in the method according to various embodiments. FIG. 6 includes an additional element not shown in FIGS. 4-5, an application 610 (i.e., in addition to the policy engine 410, the TDM process 420, the database 430, the local storage 440, and the external storage 470). According to various embodiments and referring also to the example in FIG. 6, application 610 represents a client or an external program/entity communicatively coupled to a private cloud storage ecosystem for accessing file contents via one of the aforementioned protocols (SMB, AFP, NFS). According to various embodiments, the data is managed and tracked, as described herein, to allow the movement of the data contents to be transparent to the application 610, e.g., such that the application 610 can access moved file contents in the same way it would access file contents on a NAS system, for example.

The example in FIG. 6 illustrates 10 after data and metadata are separated. In Step 1 in the example in FIG. 6, the application 610 (client or an external program/entity) creates a read and write request from the user to read/write to a "TDM file" ("File1" in the fast storage 450 of the local storage 440 in this example). As can be seen in FIG. 6, for "File1", the metadata (e.g., "File1:Metadata") is 200K stored in the fast storage 450 but 0 GB of the data (contents, i.e., "File1:Data") is stored in the fast storage 450. As shown in this example, the 10 GB of "File1:Data" had been transparently moved to the slower storage 460 (e.g., as show in the example step 3 in FIG. 5).

Step 2 in FIG. 6 includes redirecting read/write of the data contents to the TDM process 420.

In Step 3, the TDM process 420 gets from the database 430 the file destination that is associated with movement of the data contents.

In Step 4, a read/write operation is performed by the TDM process 420 on external (NSF/S3) storage (e.g., for "File2: Data" read/writes for data that had been transparently moved to the external storage 470) or local storage 440 (e.g., for "File1:Data" read/writes for data that had been transparently moved to local storage 440).

It should be appreciated that the local storage 440, fast storage 450, slower storage 460, and external storage 470 refer to the physical storage devices in FIGS. 4-6 and not to the contents of the devices as the contents can vary in accordance with the transparent movement of data, as illustrated in the examples in FIGS. 4-6.

Figure 7:
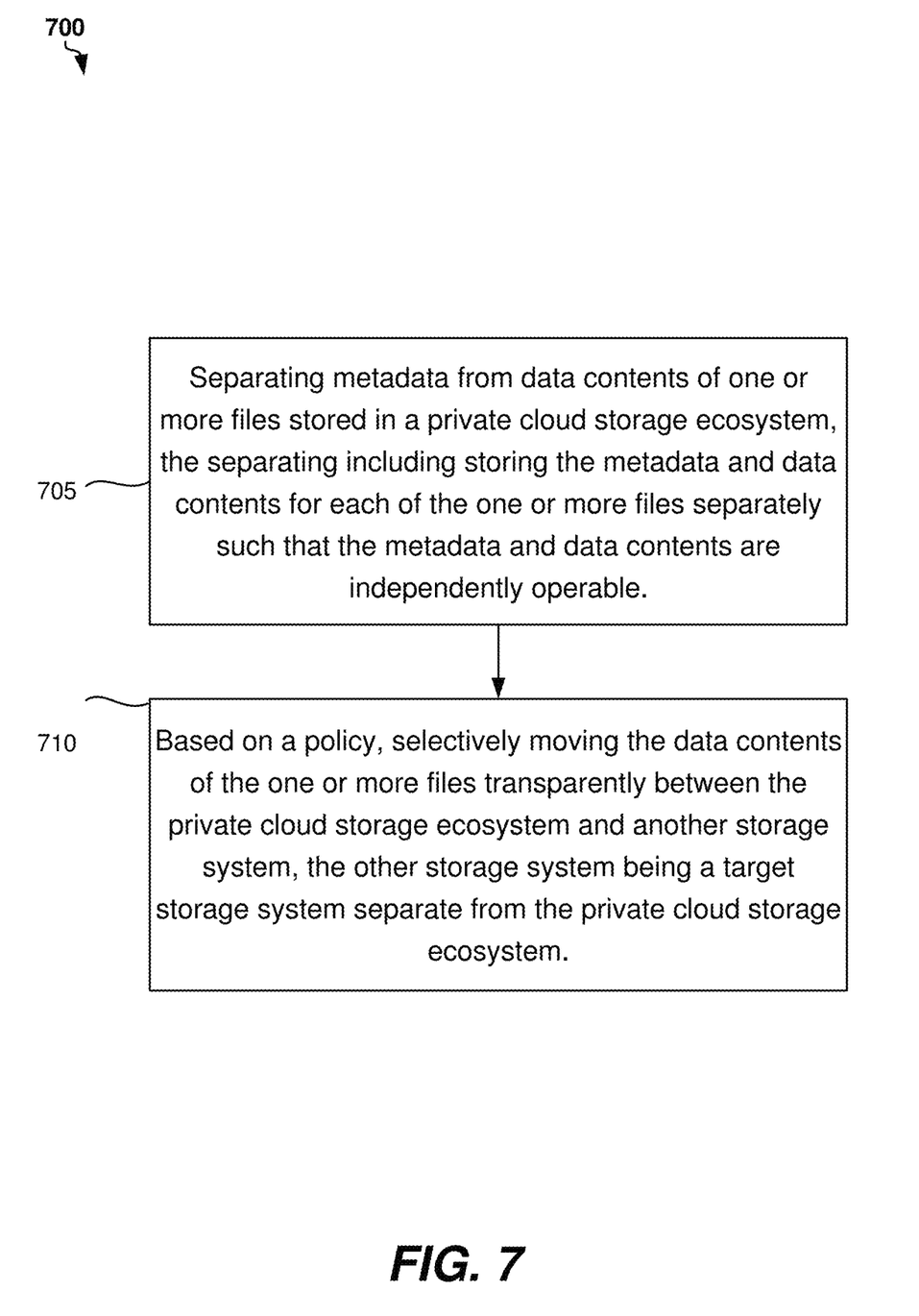
FIG. 7 is an example process flow diagram illustrating various aspects of a method for transparent data movement, according to an example embodiment.

FIG. 7 an example process flow diagram illustrating various aspects of a method 700 for transparent data movement, according to an example embodiment. Method 700 can be performed by processing logic that includes hardware (e.g., decision-making logic, dedicated logic, programmable logic, application-specific integrated circuit), software (such as software run on a general-purpose computer system or a dedicated machine), or a combination of both. Operations of method 700 recited below can be implemented in an order different than described and shown in the figure. Moreover, method 700 may have additional operations not shown herein, but which can be evident to those skilled in the art from the disclosure. Method 700 may also have fewer operations than shown in FIG. 7 and described below.

At operation 705 in the example in FIG. 7, metadata is separated from the data contents of one or more files stored in a private cloud storage ecosystem. In various embodiments, the separating includes storing the metadata and data contents for each of the one or more files separately such that the metadata and data contents are independently operable, i.e., can be operated on independently.

At operation 710, based on a policy, the method includes selectively moving the data contents of the one or more files transparently between the private cloud storage ecosystem and another storage system. In various embodiments, the other storage system is a target storage system separate from the private cloud storage ecosystem. The other storage system may be local storage in the private cloud storage ecosystem. The other storage may be external storage that is separate and apart from the private cloud storage ecosystem, e.g., a public cloud storage system, a different private cloud storage system, or disk storage on an external server, to name a few.

In various embodiments, the selective data movement to other storage is transparent in the sense that the client or external program/entity can access the data contents in the same manner as before it was transparently moved (e.g., using the same workflow or client mount points and the original metadata). In various embodiments, the metadata for each of the one or more files remains stored in its original location on the private cloud storage ecosystem, even though the corresponding file contents has been moved to the other storage system. In some embodiments, pursuant to an applicable policy, there may be transparent movement of the data contents of a file from fast storage in the private cloud storage system to slow storage. In some embodiments, the end user may later indicate that the end user no longer wants management of that file. Based on this, the data contents may be transparently moved back to fast storage on the private cloud storage ecosystem or another private cloud system; and remain on the fast storage until an end user policy dictates that the data contents should be moved back to another storage system.

Figure 8:
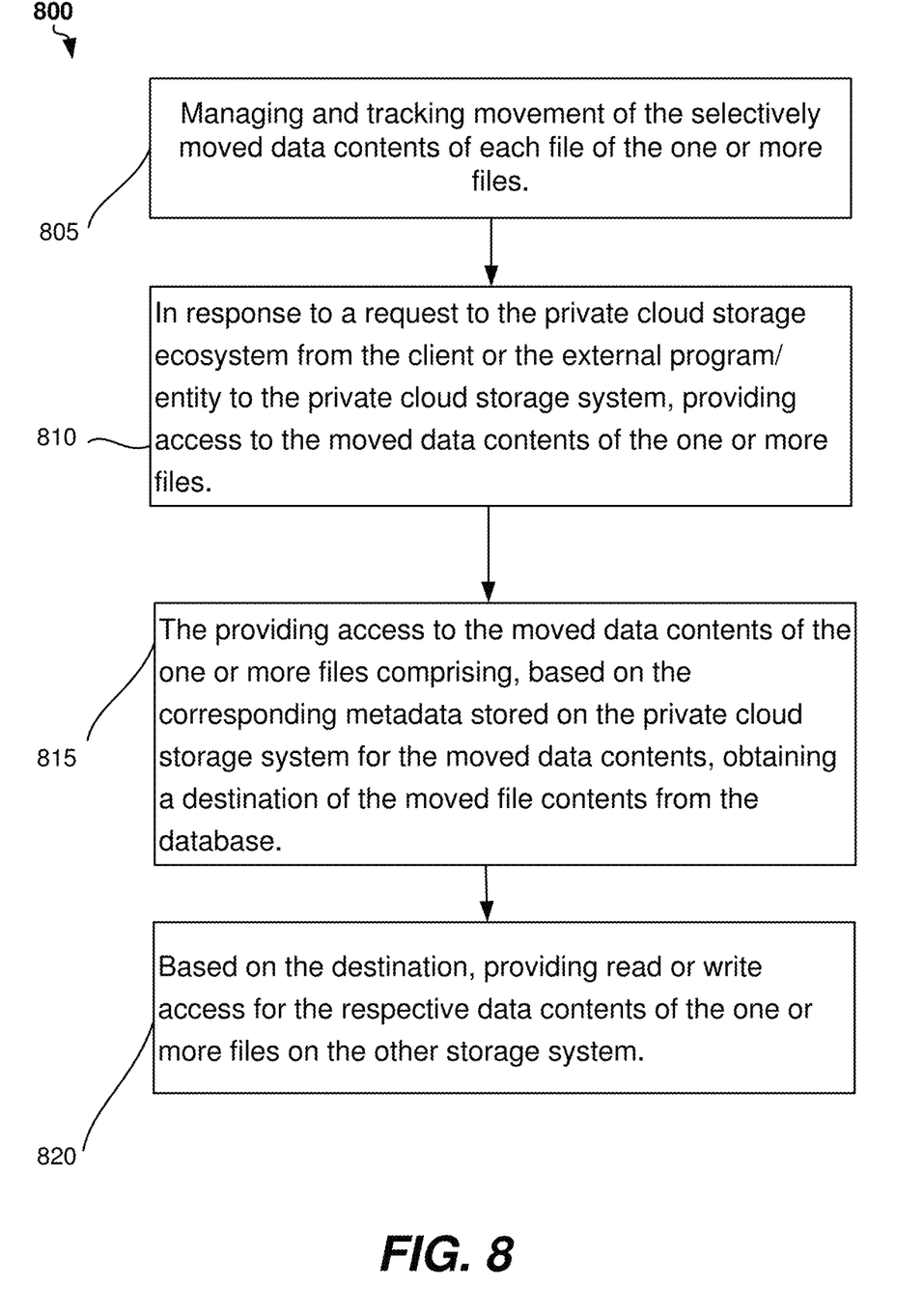
FIG. 8 is an example process flow diagram showing additional aspects of a method for transparent data movement, according to an example embodiment.

FIG. 8 is another example process flow diagram showing additional aspects of a method for transparent data movement, according to an example embodiment. At operation 805 in this example, the method includes managing and tracking movement of the selectively moved data contents of each file of the one or more files. The managing and tracking may include storing in a database an identification of each of the one or more files for which the respective data contents is being or has being selectively moved and tracking the destination of the moved data contents. The corresponding metadata for the moved data contents remains stored in its original location on the private cloud storage ecosystem.

In an example operation, a client or external program/entity creates a read/write request to the private storage ecosystem for a file. At operation 810, in response to the request, the example method provides access to the moved data contents of the one or more files. At operation 815, the providing access to the moved data contents of the one or more files comprises, based on the corresponding metadata stored on the private cloud storage system for the moved data contents, obtaining a destination of the moved file contents from the database. At operation 820, based on the destination, read or write access for the respective data contents (that has been transparently moved as described herein) of the one or more files on the other storage system is provided.

In various embodiments, the request from a client or the external program/entity is communicated to the private cloud storage system, upon which, access is provided for the moved data contents associated with the requested files. The client or the external program/entity can access moved data content using requests associated with the original metadata stored on the private cloud storage ecosystem. According to various embodiments, in creating the request, the client or the external program/entity need not be aware that the data contents has been independently and transparently moved to other storage.

Figure 9:
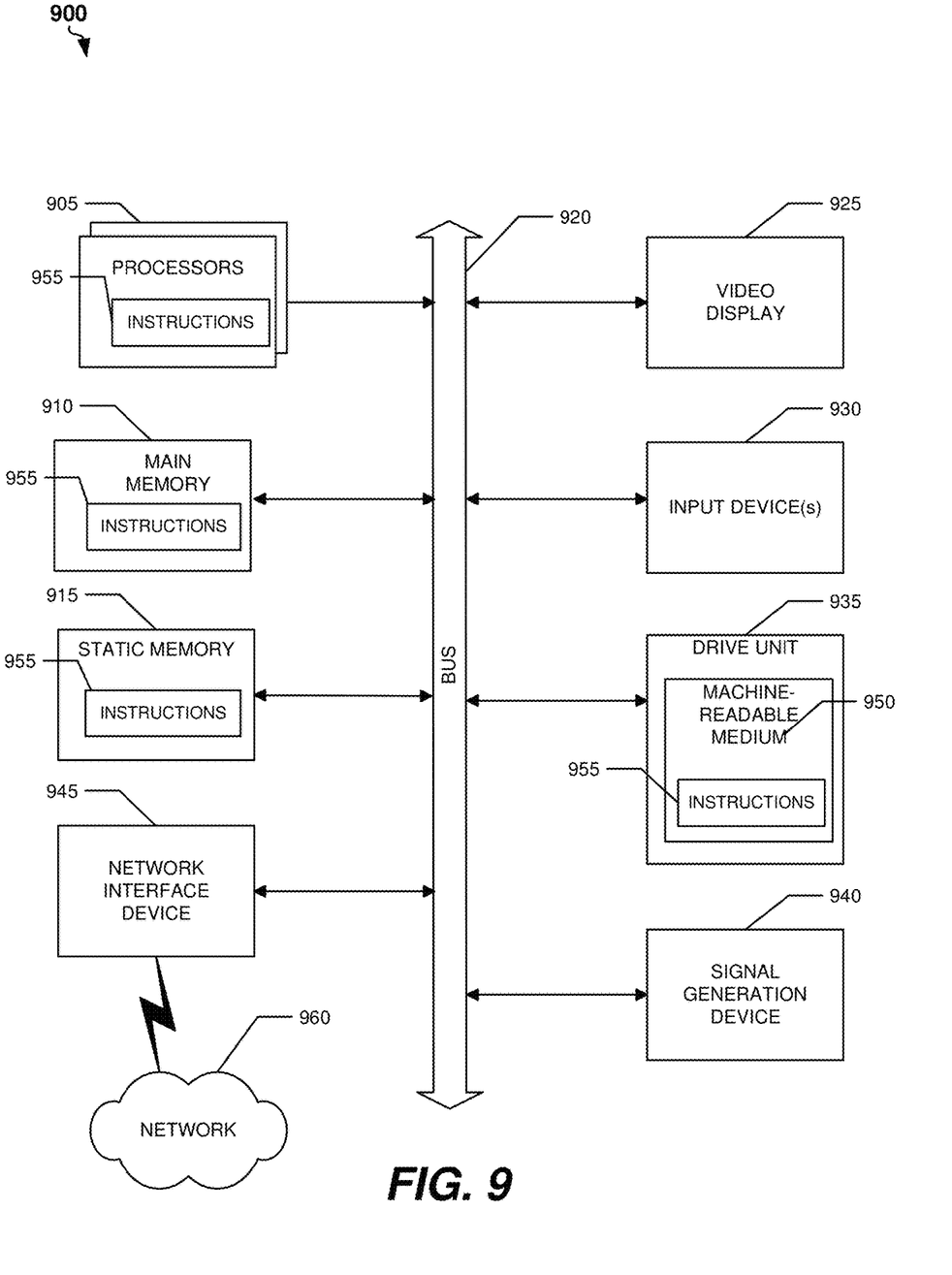
FIG. 9 is a diagrammatic representation of an example machine in the form of a computer system within which a set of instructions for the machine to perform any one or more of the methodologies discussed herein is executed.

FIG. 9 shows a diagrammatic representation of a computing device for a machine in an example electronic form of a computer system 900, within which a set of instructions for causing the machine to perform any one or more of the methods discussed herein can be executed. In example embodiments, the machine operates as a standalone device, or it can be operatively connected or networked to other machines. In a networked deployment, the machine can operate in the capacity of a server, a client machine in a server-client network environment, or as a peer machine in a peer-to-peer (or distributed) network environment. The machine can be a server, desktop personal computer (PC), laptop PC or any machine capable of executing a set of instructions that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 900 includes a processor or multiple processors 905 (e.g., a central processing units (CPU), a graphics processing unit (GPU), or both), a main memory 910, and a static memory 915, which communicate with each other via a bus 920. Computer system 900 can further include a video display 925 (e.g., a LCD, projector). Computer system 900 also includes at least one input device 930, such as an alphanumeric input device (e.g., a keyboard, keypad, remote control, graphical user interface, etc.), a cursor control device (e.g., a mouse), a microphone, a digital camera, a video camera, and so forth. Computer system 900 also includes a disk drive unit 935, a signal generation device 940 (e.g., a speaker), and a network interface device 945.

Drive unit 935 (also referred to as the disk drive unit 935) includes a machine-readable medium 950 (also referred to as a computer-readable medium 950), which stores one or more sets of instructions and data structures (e.g., instructions 955) embodying or utilized by any one or more of the methodologies or functions described herein. Instructions 955 can also reside, completely or at least partially, within the main memory 910 and/or the processors 905 during execution thereof by computer system 900. Main memory 910 and processors 905 also constitute machine-readable media.

Instructions 955 can further be transmitted or received over a communications network 960 via network interface device 945 utilizing one or more transfer protocols (e.g., Hyper Text Transfer Protocol (HTTP), Serial, and Modbus). Communications network 960 includes the Internet, television network, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, Digital Data Service (DDS) connection, Digital Subscriber Line (DSL) connection, Ethernet connection, Integrated Services Digital Network (ISDN) line, cable modem, Asynchronous Transfer Mode (ATM) connection, or a Fiber Distributed Data Interface (FDDI) or Copper Distributed Data Interface (CDDI) connection. Furthermore, communications also includes links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While machine-readable medium 950 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, RAM, ROM, and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for providing transparent movement of data between a private cloud storage ecosystem and another storage system, the method comprising:
    separating original metadata from data contents of one or more files stored in the private cloud storage ecosystem, the separating including storing the original metadata and the data contents for each of the one or more files separately such that the original metadata and the data contents become separate objects that are configured to be operated on independently from one another, the original metadata being persistently stored in an original location in the private cloud storage ecosystem and identification information being stored separately from the original metadata, the original metadata being separate from the identification information;
    after separation and based on a tier policy, selectively moving the data contents of the one or more files transparently between the private cloud storage ecosystem and the another storage system, the data contents being moved from a first tier to a selected tier that is indicated by the tier policy; and
    providing user access to the moved data contents of the one or more files, in response to a user request for the one or more files, the user request being associated with the original metadata for the moved data contents, the providing user access further comprising:
        obtaining a destination of the moved data contents of the one or more files from a database storing the identification information residing in the private cloud storage ecosystem; and
        based on the destination, providing the user access to the moved data contents of the one or more files such that workflow or client mount points appear unchanged from the user's perspective to account for the movement of the data contents of the one or more files from the first tier to the selected tier.

2. The method of claim 1, wherein the respective original metadata for each of the one or more files remains stored on the private cloud storage ecosystem after the movement of corresponding data contents to the another storage system.

3. The method of claim 1, wherein the another storage system is a slower local storage and the private cloud storage ecosystem is a faster local storage.

4. The method of claim 1, wherein the another storage system is external storage that is coupled via one or more communication networks to the private cloud storage ecosystem.

5. The method of claim 4, wherein the external storage is a public cloud storage system, a different private cloud storage system, or disk storage on an external server.

6. The method of claim 1, further comprising managing and tracking the movement of the selectively moved data contents of each file of the one or more files.

7. The method of claim 6, wherein the managing and tracking comprises: storing in the database the identification information of each of the one or more files for which the respective data contents are being or have been selectively moved and a new destination for the respective data contents that have been selectively moved; and tracking the movement of the data contents to the another storage system, corresponding original metadata remaining stored in its original location on the private cloud storage ecosystem.

8. The method of claim 6, wherein the destination is part of the identification information that is stored in the database, and the identification information is utilized in tracking movement of the moved data contents of each of the one or more files.

9. The method of claim 1, wherein the user request is a read or write request from a client or an external program/entity to the private cloud storage ecosystem, upon which the user access is provided for the data contents associated with the one or more files.

10. The method of claim 1, wherein the database is configured to provide a list of files to be moved and a current destination of the moved data contents of the one or more files.

11. The method of claim 1, wherein the user access to the moved data contents is provided to a client or an external program/entity via a network file sharing protocol, such that the client or the external program/entity accesses the requested data contents by accessing the respective original metadata stored on the private cloud storage ecosystem using the network file sharing protocol.

12. The method of claim 11, wherein the network file sharing protocol includes Service Message Block (SMB), Network File System (NFS), or Apple File Protocol (AFP) such as utilized for a Network Attached Storage system (NAS).

13. The method of claim 11, wherein the data contents are accessible to the client or the external program/entity via the network file sharing protocol using the respective original metadata such that workflow or client mount points are unchanged as a result of the movement of the data contents of the one or more files.

14. The method of claim 1, wherein the tier policy further comprises a policy specifying Hierarchical Storage Management (HSM).

15. The method of claim 1, wherein the tier policy further comprises a user-defined policy or combination of user-defined policies.

16. The method of claim 15, where the user-defined policy for selecting files to move may specify one or more of:
    selecting a folder and all its contents;
    selecting files that have not been accessed in a threshold period of time;
    setting a file size with a directory structure that should be moved;
    selecting particular file types; and
    using a metadata tag on files to override any other user-defined policy.

17. The method of claim 16, wherein the metadata tag is based on a geographical restriction so as to not permit transparent data movement out of a geographic location due to regulations of a geographic area.

18. The method of claim 1, wherein the selectively moving the data contents of the one or more files transparently between the private cloud storage ecosystem and the another storage system further comprises selectively moving the data contents in a same manner as before the data contents were moved, such that the workflow or the client mount points are unchanged as a result of the movement of the data contents of the one or more files and the data contents are accessible to the user by using the original metadata.

19. The method of claim 1, further comprising processing, by a transparent data movement server, the movement of the data contents of the one or more files based on the tier policy.

20. The method of claim 1, wherein the selectively moving the data contents of the one or more files transparently between the private cloud storage ecosystem and the another storage system is transparent to the user such that the user can access the moved data contents of the one or more files in a same way the user can access the data contents on a network attached storage (NAS) system.

21. The method of claim 1, wherein after the moving the data contents of the one or more files transparently from the private cloud storage ecosystem to the another storage system, the original metadata for each of the one or more files remains stored in the original location on the private cloud storage ecosystem.

22. The method of claim 1, wherein the selectively moving the data contents of the one or more files transparently between the private cloud storage ecosystem and the another storage system results in a reduction in capacity for storage consumption.

23. A system for providing transparent movement of data, the system comprising at least one processor and a memory communicatively coupled to the processor, the memory storing instructions executable by the processor to perform a method for providing transparent movement of data between a private cloud storage ecosystem and another storage system, the method comprising: separating original metadata from data contents of one or more files stored in the private cloud storage ecosystem, the separating including storing the original metadata and the data contents for each of the one or more files separately such that the original metadata and the data contents become separate objects that are configured to be operated on independently from one another, the original metadata being persistently stored in an original location in the private cloud storage ecosystem and identification information being stored separately from the original metadata, the original metadata being separate from the identification information; after separation and based on a tier policy, selectively moving the data contents of the one or more files transparently between the private cloud storage ecosystem and the another storage system, the data contents being moved from a first tier to a selected tier that is indicated by the tier policy; and providing user access to the moved data contents of the one or more files, in response to a user request for the one or more files, the user request being associated with the original metadata for the moved data contents, the providing user access further comprising: obtaining a destination of the moved data contents of the one or more files from a database storing the identification information residing in the private cloud storage ecosystem; and based on the destination, providing the user access to the moved data contents of the one or more files such that workflow or client mount points appear unchanged from the user's perspective to account for the movement of the data contents of the one or more files from the first tier to the selected tier.

24. A non-transitory computer readable medium having instructions stored thereon, which when executed by one or more processors, cause the one or more processors to implement a method for providing transparent movement of data between a private cloud storage ecosystem and another storage system, the method comprising: separating original metadata from data contents of one or more files stored in the private cloud storage ecosystem, the separating including storing the original metadata and the data contents for each of the one or more files separately such that the original metadata and the data contents become separate objects that are configured to be operated on independently from one another, the original metadata being persistently stored in an original location in the private cloud storage ecosystem and identification information being stored separately from the original metadata, the original metadata being separate from the identification information; after separation and based on a tier policy, selectively moving the data contents of the one or more files transparently between the private cloud storage ecosystem and the another storage system, the data contents being moved from a first tier to a selected tier that is indicated by the tier policy; and providing user access to the moved data contents of the one or more files, in response to a user request for the one or more files, the user request being associated with the original metadata for the moved data contents, the providing user access further comprising: obtaining a destination of the moved data contents of the one or more files from a database storing the identification information residing in the private cloud storage ecosystem; and based on the destination, providing the user access to the moved data contents of the one or more files such that workflow or client mount points appear unchanged from the user's perspective to account for the movement of the data contents of the one or more files from the first tier to the selected tier.

* * * * *

UNITED STATES PATENT AND TRADEMARK OFFICE
CERTIFICATE OF CORRECTION

Page 1 of 4

PATENT NO. : 12,333,173 B2
APPLICATION NO. : 15/880235
DATED : June 17, 2025
INVENTOR(S) : Halstuch et al.

It is certified that error appears in the above-identified patent and that said Letters Patent is hereby corrected as shown below:

In the Specification

In Column 2 Line 14-15, the phrase "corresponding file data contents is moved to the other storage system" should read "corresponding file data contents are moved to the other storage system".

Also, in Column 2 Line 18-19, the phrase "e.g., public cloud storage system" should read "e.g., a public cloud storage system".

In Column 2 Line 29-30, the phrase "for which the respective data contents has been or is being selectively" should read "for which the respective data contents have been or are being selectively".

In Column 3 Line 1, the phrase "Hierarchal Storage Management" should read "Hierarchical Storage Management".

In Column 4 Line 59, the phrase "FIG. 2 illustrates a diagram" should read "FIG. 2 is a diagram".

Also, in Column 4 Line 66, the phrase "file data (content) 220" should read "file data (contents) 220".

In Column 5 Line 18-19, the phrase "storage in consumed after TDM" should read "storage is consumed after TDM".

In Column 5 Line 40-41, the phrase "user 310 (client or an external program/entity)" should read "user (client or an external program/entity) 310".

In Column 6 Line 14-15, the phrase "Hierarchal Storage Management" should read "Hierarchical Storage Management".

Signed and Sealed this
Thirteenth Day of January, 2026

John A. Squires
*Director of the United States Patent and Trademark Office*

CERTIFICATE OF CORRECTION (continued)
U.S. Pat. No. 12,333,173 B2

In Column 6 Line 51-52, the phrase "Hierarchal Storage Management" should read "Hierarchical Storage Management".

In Column 6 Line 55, the phrase "as part the private" should read "as part of the private".

In Column 7 Line 1, the phrase "example FIG. 4" should read "example process 400 in FIG. 4".

In Column 7 Line 32, the phrase "an example illustrating" should read "an example 600 illustrating".

In Column 7 Line 38, the phrase "example in FIG. 6" should read "example 600 in FIG. 6".

In Column 7 Line 48, the phrase "example in FIG. 6" should read "example 600 in FIG. 6".

In Column 7 Line 49, the phrase "example in FIG. 6" should read "example 600 in FIG. 6".

In Column 7 Line 58, the phrase "(e.g., as show" should read "(e.g., as shown".

In Column 8 Line 10, the phrase "FIG. 7 an example" should read "FIG. 7 is an example".

In Column 8 Line 31-32, the phrase "the method includes" should read "the method 700 includes".

In Column 8 Line 51, the phrase "contents has been moved" should read "contents have been moved".

In Column 8 Line 60, the word "system;" should read "system,".

In Column 8 Line 64, the phrase "method for transparent" should read "method 800 for transparent".

In Column 8 Line 66, the phrase "the method includes" should read "the method 800 includes".

In Column 9 Line 4, the phrase "is being or has being selectively" should read "are being or have been selectively".

In Column 9 Line 11, the phrase "example method provides" should read "example method 800 provides".

In Column 9 Line 19, the phrase "(that has been" should read "(that have been".

In Column 9 Line 31, the phrase "contents has been" should read "contents have been".

In Column 9 Line 53-54, the phrase "processing units (CPU)" should read "processing unit (CPU)".

CERTIFICATE OF CORRECTION (continued)
U.S. Pat. No. 12,333,173 B2

In the Claims

In Column 12 Lines 7-15, Claim 7 should read:
"7. The method of claim 6, wherein the managing and tracking comprises:
   storing in the database the identification information of each of the one or more files for which the respective data contents are being or have been selectively moved and a new destination for the respective data contents that have been selectively moved; and
   tracking the movement of the data contents to the another storage system, corresponding original metadata remaining stored in its original location on the private cloud storage ecosystem.".

In Column 13 Line 32 - Column 14 Line 16, Claim 23 should read:
"23. A system for providing transparent movement of data, the system comprising at least one processor and a memory communicatively coupled to the processor, the memory storing instructions executable by the processor to perform a method for providing transparent movement of data between a private cloud storage ecosystem and another storage system, the method comprising:
   separating original metadata from data contents of one or more files stored in the private cloud storage ecosystem, the separating including storing the original metadata and the data contents for each of the one or more files separately such that the original metadata and the data contents become separate objects that are configured to be operated on independently from one another, the original metadata being persistently stored in an original location in the private cloud storage ecosystem and identification information being stored separately from the original metadata, the original metadata being separate from the identification information;
   after separation and based on a tier policy, selectively moving the data contents of the one or more files transparently between the private cloud storage ecosystem and the another storage system, the data contents being moved from a first tier to a selected tier that is indicated by the tier policy; and
   providing user access to the moved data contents of the one or more files, in response to a user request for the one or more files, the user request being associated with the original metadata for the moved data contents, the providing user access further comprising:
      obtaining a destination of the moved data contents of the one or more files from a database storing the identification information residing in the private cloud storage ecosystem; and
         based on the destination, providing the user access to the moved data contents of the one or more files such that workflow or client mount points appear unchanged from the user's perspective to account for the movement of the data contents of the one or more files from the first tier to the selected tier.".

In Column 14 Lines 17-51, Claim 24 should read:
"24. A non-transitory computer readable medium having instructions stored thereon, which when executed by one or more processors, cause the one or more processors to implement a method for providing transparent movement of data between a private cloud storage ecosystem and another storage system, the method comprising:
   separating original metadata from data contents of one or more files stored in the private cloud storage ecosystem, the separating including storing the original metadata and the data contents for each of the one or more files separately such that the original metadata and the data contents become separate objects that are configured to be operated on independently from one another, the original metadata being persistently stored in an original location in the private cloud storage ecosystem and identification information being stored separately from the original metadata, the original metadata being separate from the identification information;

after separation and based on a tier policy, selectively moving the data contents of the one or more files transparently between the private cloud storage ecosystem and the another storage system, the data contents being moved from a first tier to a selected tier that is indicated by the tier policy; and providing user access to the moved data contents of the one or more files, in response to a user request for the one or more files, the user request being associated with the original metadata for the moved data contents, the providing user access further comprising:

obtaining a destination of the moved data contents of the one or more files from a database storing the identification information residing in the private cloud storage ecosystem; and based on the destination, providing the user access to the moved data contents of the one or more files such that workflow or client mount points appear unchanged from the user's perspective to account for the movement of the data contents of the one or more files from the first tier to the selected tier.".